(12) United States Patent
Kaneko et al.

(10) Patent No.: US 6,950,216 B2
(45) Date of Patent: Sep. 27, 2005

(54) LIGHT SOURCE APPARATUS AND OPTICAL SCANNER

(75) Inventors: Koji Kaneko, Saitama (JP); Mitsuhiro Ohno, Saitama (JP)

(73) Assignee: Fujinon Corporation, Omiya (JP)

( * ) Notice: Subject to any disclaimer, the term of this patent is extended or adjusted under 35 U.S.C. 154(b) by 0 days.

(21) Appl. No.: 10/452,662

(22) Filed: May 30, 2003

(65) Prior Publication Data

US 2003/0227659 A1 Dec. 11, 2003

(30) Foreign Application Priority Data

Jun. 6, 2002 (JP) ......................................... 2002-165614

(51) Int. Cl.⁷ .............................................. G02B 26/08
(52) U.S. Cl. ...................................................... 359/204
(58) Field of Search ................................ 359/204, 216; 347/243, 233

(56) References Cited

U.S. PATENT DOCUMENTS

| | | | | | |
|---|---|---|---|---|---|
| 4,325,070 A | * | 4/1982 | Akasaki et al. | ............. | 347/233 |
| 6,081,364 A | * | 6/2000 | Kimura | ........................ | 359/204 |
| 6,133,566 A | * | 10/2000 | Yamaguchi | .................. | 250/234 |
| 6,381,057 B1 | * | 4/2002 | Itabashi | ....................... | 359/204 |

* cited by examiner

Primary Examiner—Euncha P. Cherry
(74) Attorney, Agent, or Firm—Frommer Lawrence & Haug LLP; Matthew K. Ryan, Esq.

(57) ABSTRACT

Provided are a light source apparatus capable of preventing a shift in an optical path of a light beam, and an optical scanner comprising the light source apparatus. An optical scanner comprises a light source apparatus in which four light sources corresponding to four colors Y, M, C and B are supported as a unit by one holder. The light sources are integrally disposed in a specific position (a position where the holder is disposed) on an optical base as a supporting base, so even if distortion of the optical base occurs resulting from a dynamic load, ambient temperature or the like, an influence of the distortion is exerted upon each of the light sources supported by the holder to substantially the same extent. Even if a shift in the whole arrangement of the light sources occurs, a large shift in a positional relationship between each light source does not occur. Therefore, compared to the case where the light sources are separately arranged, a shift in a relative positional relationship between optical paths of laser beams can become less likely to occur.

5 Claims, 10 Drawing Sheets

FIG. 14A  FIG. 14B

LIGHT SOURCE APPARATUS AND OPTICAL SCANNER

BACKGROUND OF THE INVENTION

1. Field of the Invention

The present invention relates to a light source apparatus emitting a plurality of light beams, and an optical scanner for optically scanning a scanned surface by using the plurality of light beams emitted from the light source apparatus.

2. Description of the Related Art

In recent years, according to a development in digital technologies, various kinds of image forming apparatuses are used as image data output apparatuses. Among them, for example, a full-color laser printer is superior because of higher image quality and shorter output time.

A laser printer mainly comprises an optical system unit for image formation, that is, an optical scanner, by which a desired image corresponding to image data can be formed. More specifically, in the optical scanner, when a laser beam is emitted from a light source apparatus mainly in a state in which a polygon mirror is rotating at constant speed, the laser beam is reflected by the polygon mirror to be successively deflected, and the deflected laser beam repetitively scans a photosensitive drum. Then, an electrostatic latent image formed through scanning by the laser beam is developed by using a toner, and the developed image is transferred to a paper. Thereby, an image corresponding to the image data is formed on the paper. In a full-color laser printer, in order to reproduce a full-color image, for example, a light source apparatus including four light sources corresponding to four color, that is, yellow (Y), magenta (M), cyan (C), black (B) is mounted in the optical scanner, and four photosensitive drums corresponding to these four light sources is used to form an electrostatic latent image.

In order to achieve higher image quality in the full-color laser printer, for example, it is required to reduce an influence of a color shift in an image as much as possible. The "color shift" is a problem in image formation, that is, a shift between each color (Y, M, C and B) in an image finally formed mainly due to a shift in an optical path of the laser beam from the light source apparatus to the photosensitive drum. When the color shift occurs, color reproducibility of the image or the like declines, thereby resulting in a decline in image quality.

However, in a conventional full-color laser printer, there is a possibility that the optical path of the laser beam is largely shifted mainly due to design factors and operating environments, so measures to reduce the influence of the color shift have not been sufficient yet. In consideration of a recent rapid advance in digital technologies, higher image quality of the full-color laser printer is an urgent necessity.

Moreover, in the conventional full-color laser printer, in order to be capable of deflecting a plurality of laser beams, the polygon mirror is upsized. Thereby, power consumption required to actuate the polygon mirror becomes higher, and a rotating mechanism may become unstable due to vibrations or the like.

SUMMARY OF THE INVENTION

In view of the foregoing, it is a first object of the invention to provide a light source apparatus capable of preventing a shift in an optical path of a light beam, and an optical scanner comprising the light source apparatus.

Moreover, it is a second object of the invention to provide a light source apparatus and an optical scanner capable of downsizing a polygon mirror.

A light source apparatus according to the invention is used in an optical scanner for scanning a scanned surface by a plurality of light beams, and the light source apparatus comprises: four or more light sources each emitting a light beam; and one supporting body supporting the four or more light sources arranged along a first direction corresponding to a main scanning direction.

In the light source apparatus according to the invention, four or more light sources each emitting a light beam are supported as a unit by one supporting body in a state in which the light sources are arranged along the first direction corresponding to the main scanning direction.

An optical scanner according to the invention comprises: a light source apparatus emitting a plurality of light beams to scan a scanned surface; and a light deflection apparatus deflecting the plurality of light beams emitted from the light source apparatus, wherein the light source apparatus comprises: four or more light sources each emitting a light beam, and one supporting body supporting the four or more light sources arranged along a first direction corresponding to a main scanning direction.

In the optical scanner according to the invention, the scanned surface is scanned by the light beam by using the light source apparatus according to the invention and the light deflection apparatus.

In the light source apparatus according to the invention, it is preferable that the light beam is deflected by a deflection surface of a light deflection apparatus so as to scan a scanned surface, and the four or more light sources are arranged so that light beams emitted from light sources come closer to one another in a plane including the first direction, and light beams emitted from two outer light sources become parallel to each other in a plane including a second direction corresponding to a sub-scanning direction, and light beams emitted from two inner light sources come closer to each other in the plane including the second direction, and further the light beams emitted from the two outer light sources and the light beams emitted from the two inner light sources intersect with each other on the deflection surface of the light deflection apparatus.

In the light source apparatus according to the invention, the whole width of the light beams emitted from four or more light source is minimized on the deflection surface of the light deflection apparatus.

Moreover, in the light source apparatus according to the invention, four or more light sources may be arranged in a staggered pattern in a plane including the first direction and the second direction.

Further, the light source apparatus according to the invention may further comprise a collimator lens, a stop and a cylindrical lens for each of light sources. In this case, it is preferable that the position of at least one of the collimator lens or the cylindrical lens is adjustable.

Other and further objects, features and advantages of the invention will appear more fully from the following description.

DETAILED DESCRIPTION OF THE PREFERRED EMBODIMENTS

Preferred embodiments of the present invention are described in more detail below referring to the accompanying drawings.

Figure 1:
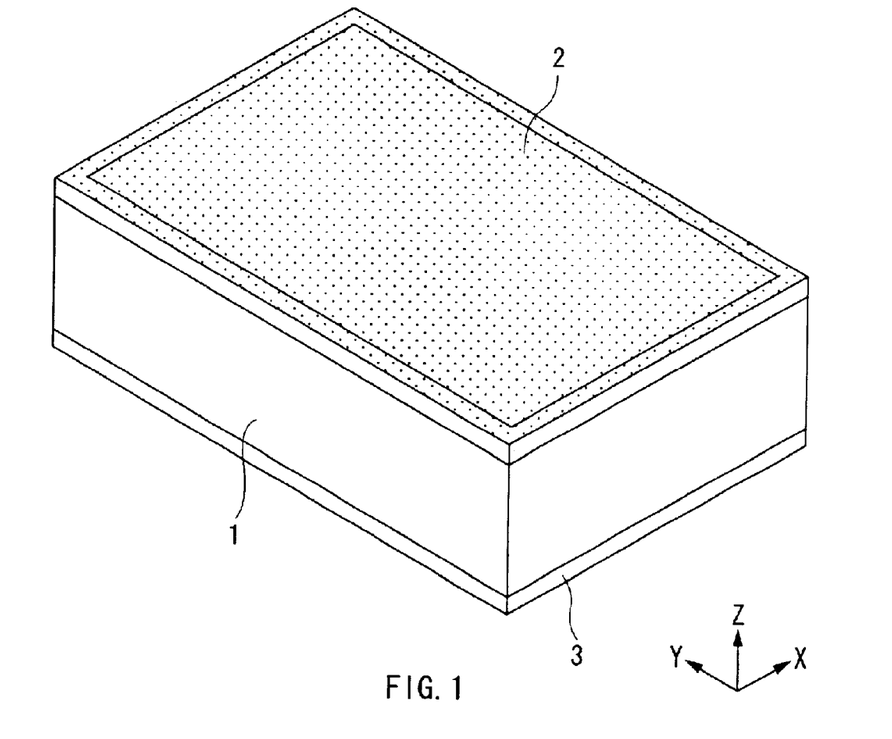
FIG. 1 is a perspective view of an optical scanner according to an embodiment of the invention.
Figure 2:
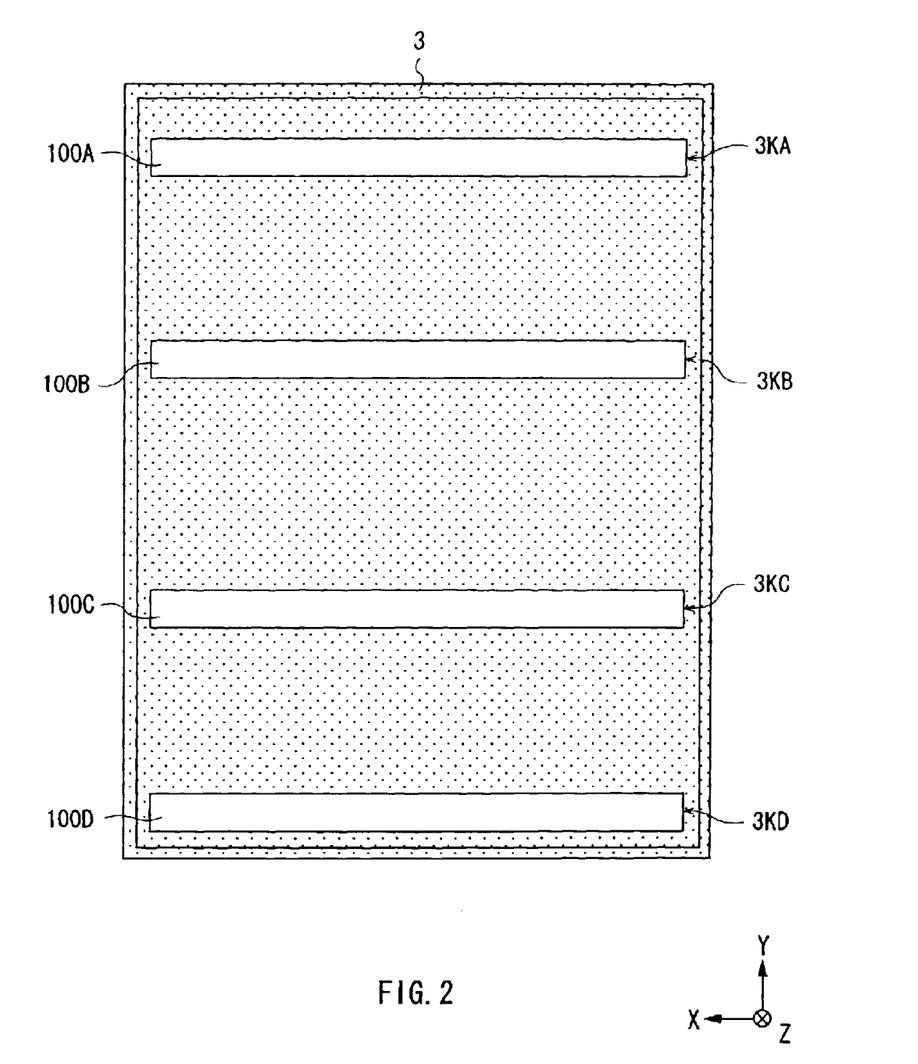
FIG. 2 is a plan view of a bottom cover of the optical scanner according to the embodiment of the invention.
Figure 3:
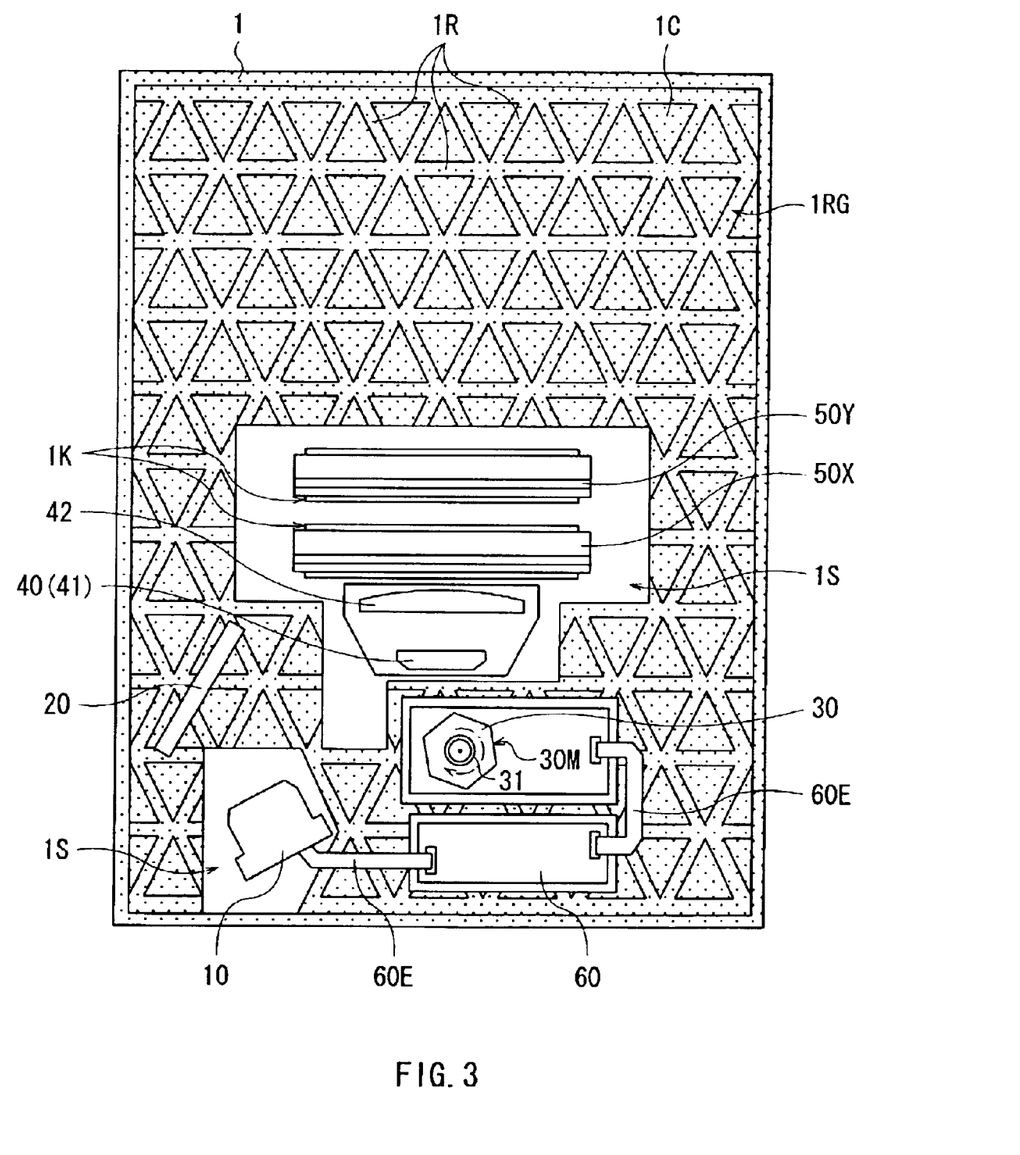
FIG. 3 is a top view of the optical scanner according to the embodiment of the invention.
Figure 4:
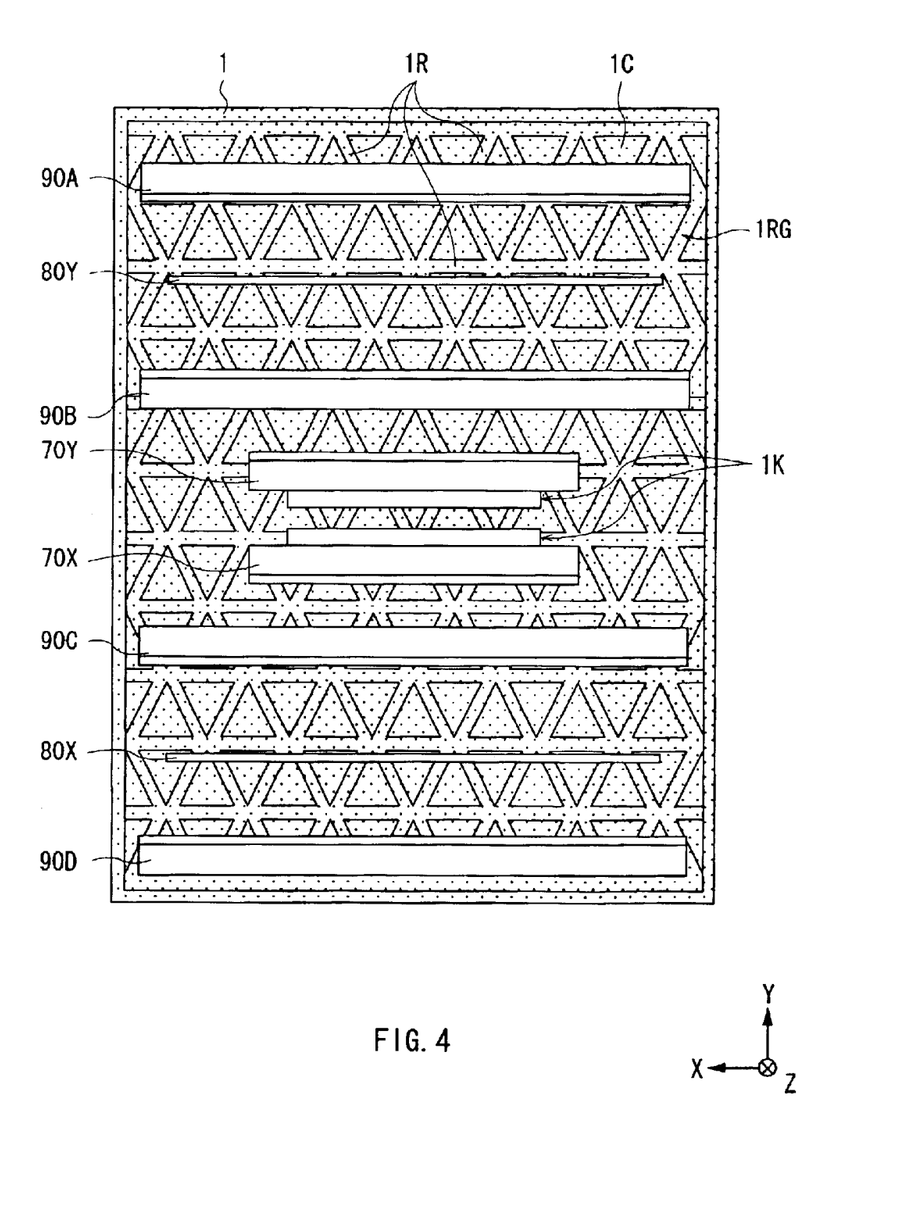
FIG. 4 is a bottom view of the optical scanner according to the embodiment of the invention.

Firstly, referring to FIGS. 1 through 4, the structure of an optical scanner according to an embodiment of the invention will be described below. FIG. 1 shows an external perspective view of the optical scanner, and FIGS. 2, 3 and 4 show plan views of each part of the optical scanner. FIGS. 2, 3 and 4 show a bottom surface of a bottom cover 3, a top surface of an optical base 1, and a bottom surface of the optical base 1, respectively. The "top surface" and the "bottom surface" mean a surface on a top side and a surface on a bottom side in a Z-axis direction in FIG. 1, respectively. A "light source apparatus" according to the invention is a component of the optical scanner according to the embodiment of the invention, so the light source apparatus will be also described below.

The optical scanner according to the embodiment of the invention has a light beam scanning mechanism, and is mounted in, for example, an optical device (image forming apparatus) such as a full-color laser printer. As shown in FIG. 1, the optical scanner has, for example, a structure in which a series of components (optical components) to be described later are contained in an enclosure including an optical base 1 and two covers (a top cover 2 and a bottom cover 3) with the optical base 1 in between.

The optical base 1 is a double-sided mounting type base as a base of the optical scanner. For example, as shown in FIGS. 3 and 4, the optical base 1 has a honeycombed strengthening rib structure 1RG having a plurality of ribs 1R which form a polygonal opening, for example, a substantially triangular opening. The strengthening rib structure 1RG mainly secures mechanical strength of the optical base 1, and has a large number of unpierced cells 1C on both sides (the top surface and the bottom surface) of the optical base 1.

The top cover 3 is laid above the optical base 1, and the bottom cover 2 is laid below the optical base 1. As shown in FIG. 2, the bottom cover 3 has four light outlets 3KA, 3KB, 3KC and 3KD for guiding a laser beam to the outside of the optical scanner in positions corresponding to cylindrical mirrors 90A, 90B, 90C and 90D, which will be described later, respectively, and four cover glasses 100A, 100B, 100C and 100D for dust control are disposed on the light outlets 3KA, 3KB, 3KC and 3KD, respectively.

As shown in FIG. 3, for example, a plurality of storage spaces 1S, which are formed through removing a predetermined range of the strengthening rib structure 1RG, are disposed on the top surface of the optical base 1, and mainly a light source apparatus 10, a reflective mirror 20 disposed corresponding to the light source apparatus 10, the polygon mirror 30, a fθ lens 40, reflective mirrors 50X and 50Y disposed corresponding to the fθ lens 40, and a control circuit board 60 are disposed in the storage spaces 1S.

The light source apparatus 10 emits a plurality (for example, four) of laser beams (light beams) for scanning, and is disposed so that the emitting directions of the laser beams correspond to the position where the reflective mirror 20 is disposed. The light source apparatus 10 is an apparatus integrally combining four light sources which each emit a laser beam for forming a latent image corresponding to four colors, that is, for example, yellow (Y), magenta (M), cyan (C) and black (B) on photosensitive drums 110A, 110B, 110C and 110D (refer to FIG. 10) to be described later, respectively. The structure of the light source apparatus 10 will be described later in more detail (refer to FIGS. 5 through 8).

The reflective mirror 20 reflects the laser beams emitted from the light source apparatus 10 toward the polygon mirror 30.

The polygon mirror 30 has, for example, a substantially hexagonal structure having six deflection surfaces 30M, and can rotate around a rotating shaft 31 in a direction indicated by an arrow in the drawing (in a clockwise direction). The polygon mirror 30 deflects the laser beams toward the reflective mirrors 50X and 50Y on each deflection surface 30M according to the rotation of the polygon mirror 30. Herein, the polygon mirror 30 corresponds to a specific example of "a light deflection apparatus" in the invention.

The fθ lens 40 condenses the laser beams in a first direction corresponding to a main scanning direction. The fθ lens 40 is a group of a plurality of lenses for keeping a constant scanning speed in the main scanning direction on the photosensitive drums 110A, 110B, 110C and 110D (refer to FIG. 10) to be described later, and includes, for example, two lenses 41 and 42 disposed along optical paths of the laser beams. The meaning of "a first direction corresponding to a main scanning direction" will be described later.

The reflective mirrors 50X and 50Y reflect the laser beams downward so as to guide the laser beams to the bottom surface of the optical base 1 through openings 1K disposed in the optical base 1. The reflective mirrors 50X and 50Y are disposed in different positions from each other in a height direction (for example, a direction perpendicular to a paper surface in FIG. 5) (refer to FIG. 10).

The control circuit board 60 mainly controls the light source apparatus 10 or the polygon mirror 30, and is connected to the light source apparatus 10 or a circuit board for the polygon mirror 30 (not shown) through a connector cable 60E.

As shown in FIG. 4, mainly reflective mirrors 70X and 70Y disposed corresponding to the reflective mirrors 50X and 50Y, reflective mirrors 80X and 80Y disposed corresponding to the reflective mirrors 70X and 70Y, and cylindrical mirrors 90A, 90B, 90C and 90D are disposed on the bottom surface of the optical base 1.

The reflective mirrors 70X, 70Y, 80X and 80Y reflect the laser beams, which are guided to the bottom surface of the optical base 1 by the reflective mirrors 50X and 50Y, toward the cylindrical mirrors 90A, 90B, 90C and 90D.

The cylindrical mirrors 90A, 90B, 90C and 90D reflect the laser beams toward the photosensitive drums 110A, 110B, 110C and 110D (refer to FIG. 10) while condensing the laser beams in a second direction corresponding to a sub-scanning direction. The cylindrical mirrors 90A, 90B, 90C and 90D are disposed at a distance away from one another corresponding to the photosensitive drums 110A, 110B, 110C and 110D. The meaning of "a second direction corresponding to a sub-scanning direction" will be described later.

Figure 5:
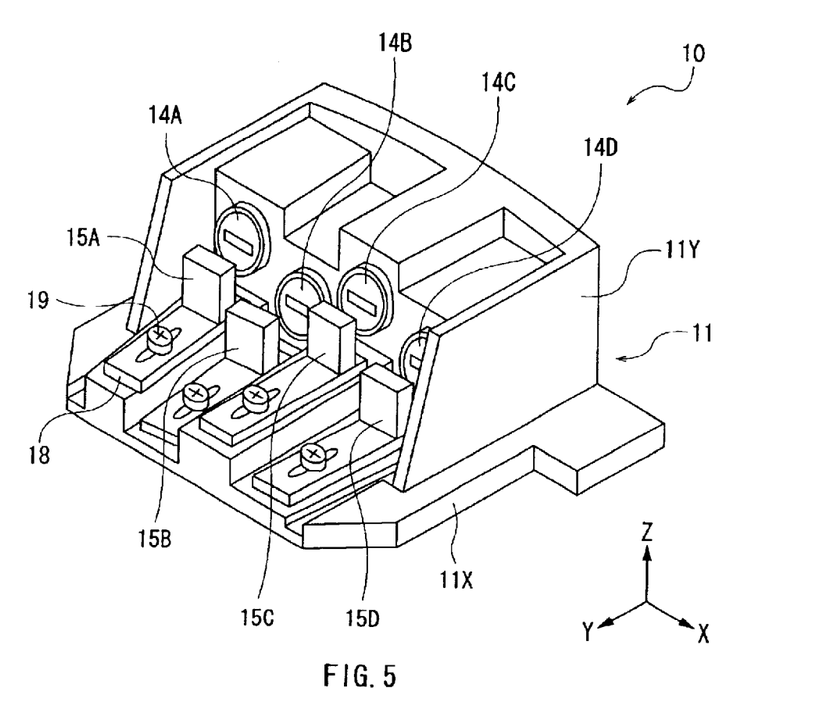
FIG. 5 is an enlarged perspective view of a light source apparatus according to an embodiment of the invention.
Figure 6:
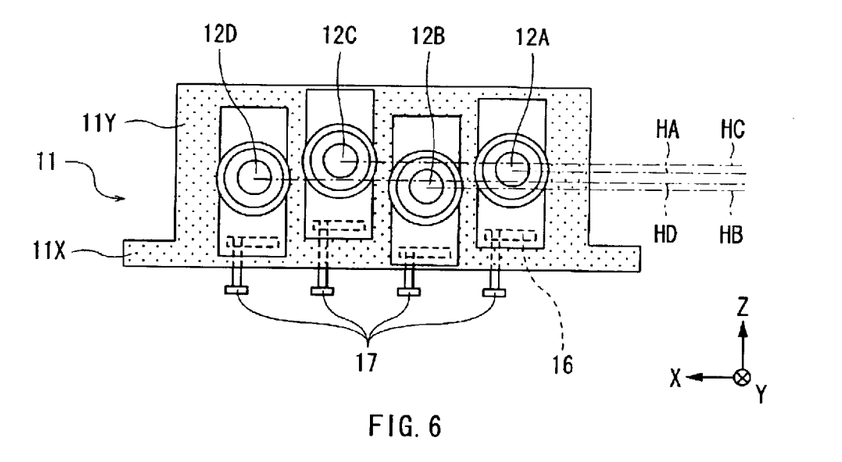
FIG. 6 is an enlarged back view of the light source apparatus shown in FIG. 5.
Figure 7:
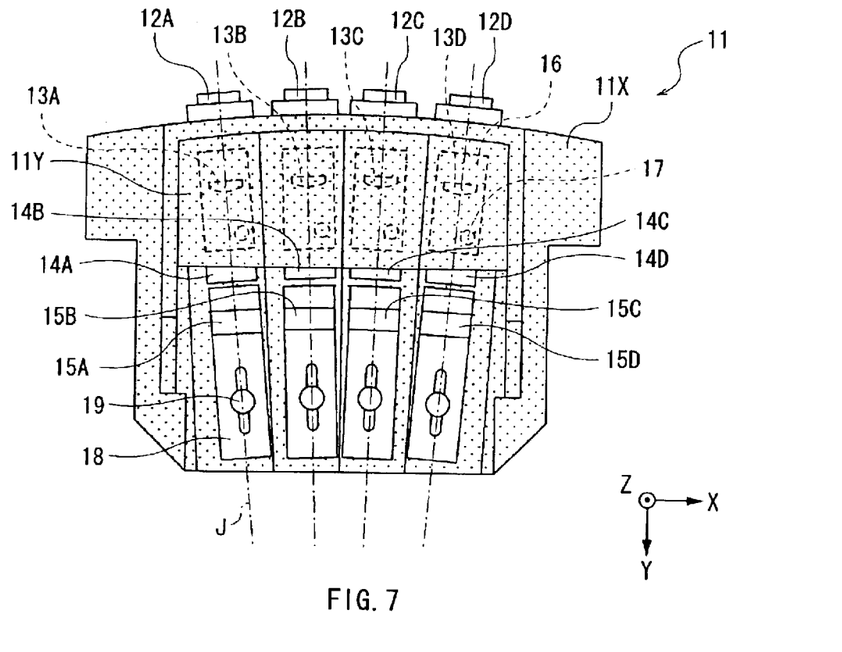
FIG. 7 is an enlarged top view of the light source apparatus shown in FIG. 5.
Figure 8:
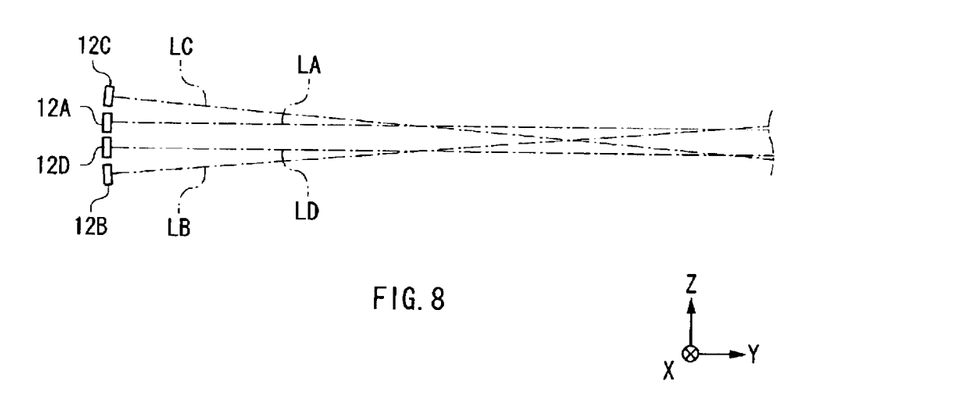
FIG. 8 is an illustration showing the arrangement of light sources when the light source apparatus shown in FIG. 5 is viewed from its side.

Next, referring to FIGS. 5 through 8, the structure of the light source apparatus 10 will be described below in detail. FIGS. 5 through 8 show enlarged views of the light source apparatus 10. FIGS. 5, 6 and 7 show a perspective view, a back view and a top view of the light source apparatus 10, respectively, and FIG. 8 is an illustration showing the arrangement of the light sources when viewed from a side of the light source apparatus 10. For the sake of simplifying the description about an optical path of a laser beam emitted from each light source, FIG. 8 shows a state in which a series of the optical paths of the laser beams are projected to the same plane (hereinafter referred to "projection plane").

The meaning of "a first direction corresponding to a main scanning direction (hereinafter simply referred to "the first direction") is a direction corresponding to a direction where a laser beam spot moves (the main scanning direction) on the photosensitive drums 110A, 110B, 110C and 110D (refer to FIG. 10), and more specifically, an X-axis direction in FIGS. 5 through 8. The meaning of "a second direction corresponding to a sub-scanning direction (hereinafter simply referred to as "the second direction") is a direction orthogonal to the main scanning direction on the photosensitive drums 110A, 110B, 110C and 110D, that is, a direction corresponding to a direction where scanned surfaces on the photosensitive drums 110A through 110D moves during scanning by the laser beams, and more specifically, an Z-axis direction in FIGS. 5 through 8.

The light source apparatus 10 has a structure in which a plurality (for example, four) of light sources 12A, 12B 12C and 12D are supported as a unit by one holder 11. The holder 11 also supports, for example, collimator lenses 13A, 13B, 13C and 13D, stops 14A, 14B, 14C and 14D, and cylindrical lenses 15A, 15B, 15C and 15D, all of which correspond to the light sources 12A, 12B, 12C and 12D, respectively. The collimator lenses 13A through 13D, the stops 14A through 14D and the cylindrical lenses 15A through 15D are disposed on each optical axis J of the laser beam emitted from each of the light sources 12A through 12D, respectively. Herein, the holder 11 corresponds to a specific example of "a supporting body" in the invention.

As shown in FIGS. 5 through 7, the holder 11 is, for example, an integrally molded body including a plate-shaped base 11X on the bottom side and a box-shaped storage portion 11Y on the top side. The base 11X and the storage portion 11Y each have a step-shaped structure corresponding to the height where each of the light sources 12A through 12D is disposed.

Each of the light sources 12A, 12B, 12C and 12D emits a laser beam for scanning, and is, for example, disposed on a back surface portion of the holder 11 (the storage portion 11Y) so that an emitting end thereof is directed to the front. Each of the light sources 12A through 12D is arranged so as to have the following three-dimensional positional relationship with one another. In other words, as shown in FIGS. 6 and 8, the light sources 12A, 12B, 12C and 12D are arranged in this order along the first direction (X-axis direction), and more specifically, as shown in FIG. 6, the light sources 12A, 12B, 12C and 12D are arranged in a stagger (zigzag) pattern in a plane including the first direction (X-axis direction) and the second direction (Z-axis direction) so that the heights HA, HB, HC and HD of the light sources 12A, 12B, 12C and 12D, respectively, are arranged in the order of HC, HA, HD and HB, highest the first. Moreover, as shown in FIG. 7, the light sources 12A, 12B, 12C and 12D are arranged so that the laser beams emitted from the light sources 12A through 12D come closer to one another in a plane including the first direction (X-axis direction) (that is, a plane including an X axis and a Y axis). Further, as shown in FIG. 8, the light sources 12A through 12D are arranged so that the laser beams LA and LD emitted from two inner light sources 12A and 12D, respectively, become parallel to each other in a plane including the second direction (Z-axis direction) (that is, the projection plane; a plane including the Y axis and the Z axis), and the laser beams LB and LC emitted from two outer light sources 12B and 12C, respectively, come closer to each other in the plane including the second direction (that is, projection plane). The laser beams LA and LD emitted from the two inner light sources 12A and 12D, and the laser beams LB and LC emitted from the two outer light sources 12B and 12C intersect with each other, for example, in the deflection surface 30M of the polygon mirror 30. In FIG. 8, for the sake of easily showing the optical paths of the laser beams LA, LB, LC and LD, the light sources 12A, 12B, 12C and 12D are disposed at a distance extremely away from one another.

The collimator lenses 13A, 13B, 13C and 13D mainly make each of the laser beams emitted from the light sources 12A through 12D parallel rays, and, for example, as shown in FIG. 7, the collimator lenses 13A through 13D are contained in the storage portion 11Y of the holder 11 in a state where each of them is fixed on a supporting base 16. For example, as shown in FIG. 6, four adjusting screws 17 which are connected to the supporting bases 16 through the storage portion 11Y are disposed on the holder 11 so as to correspond to the supporting bases 16 on which the collimator lenses 13A, 13B, 13C and 13D are fixed. The adjusting screws 17 are, for example, eccentric screws, and the supporting bases 16 are moved by using the adjusting screws 17 so as to make the positions of the collimator lenses 13A, 13B, 13C and 13D adjustable.

The stops 14A, 14B, 14C and 14D are optical parts having a slit-shaped opening mainly for passing only a part of the laser beams emitted from the light sources 12A, 12B, 12C and 12D therethrough, and are disposed on a front surface of the storage portion 11Y.

The cylindrical lenses 15A, 15B, 15C and 15D mainly correct astigmatic aberrations of the laser beams, and each of them is fixed on a supporting plate 18. A slit portion is disposed in each supporting plate 18, and an adjusting screw 19 for fixing each supporting plate 18 to the holder 11 (base 11X) is disposed in the slit portion. The supporting plate 18 slides back and forth by using the adjusting screw 19 so as to make the position of each of the cylindrical lenses 15A, 15B, 15C and 15D adjustable.

Figure 9:
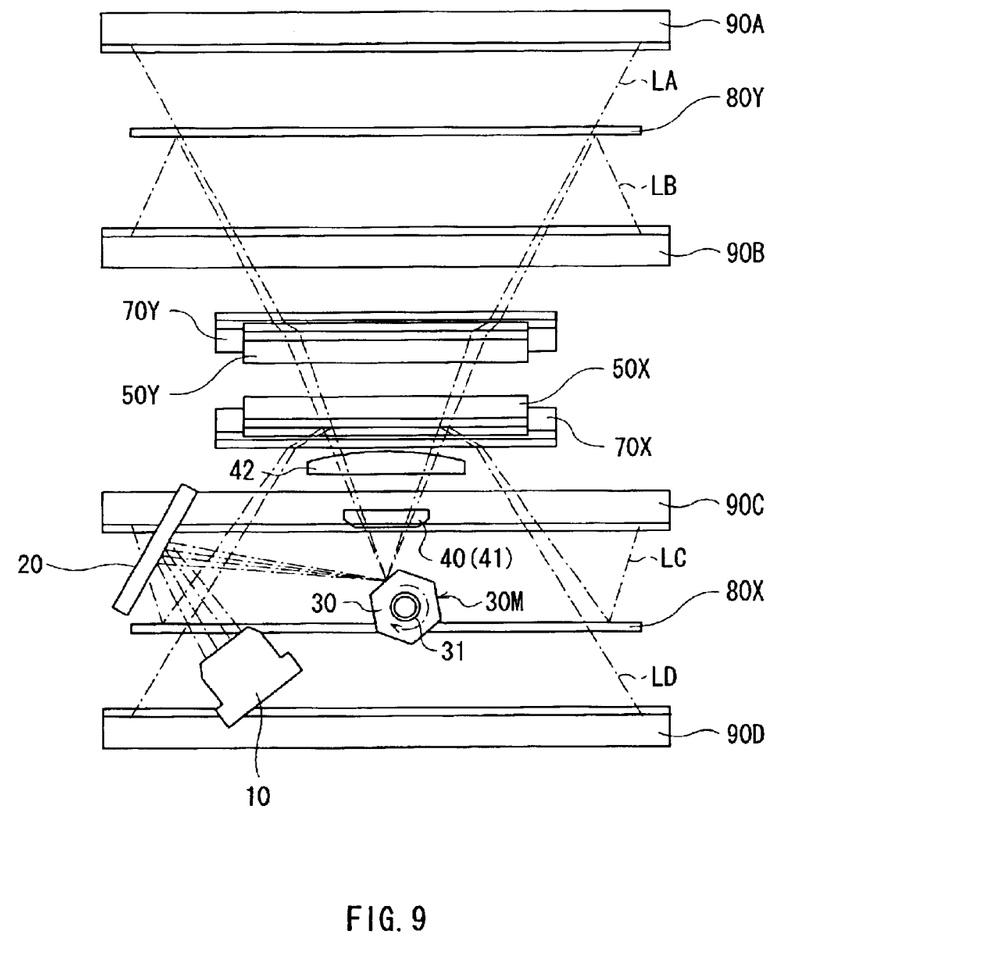
FIG. 9 is a top view of optical paths of laser beams under operating conditions of the optical scanner according to the embodiment of the invention.
Figure 10:
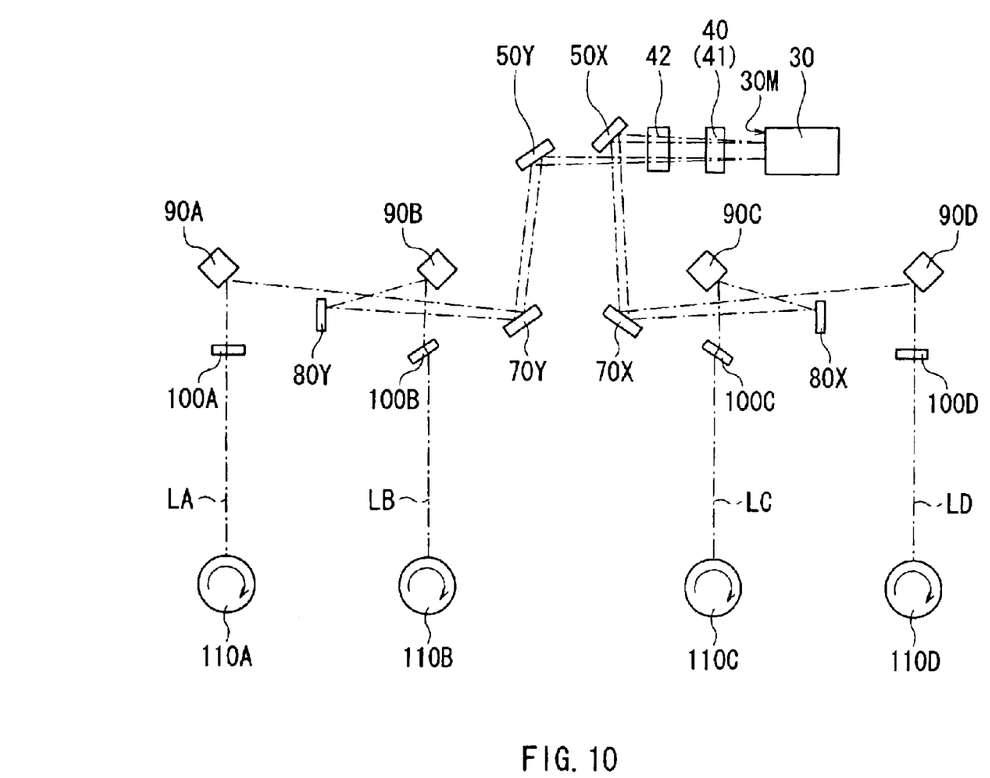
FIG. 10 is a side view of the optical paths of the laser beams under operating conditions of the optical scanner according to the embodiment of the invention.

Next, referring to FIGS. 1 through 10, the operation of the optical scanner will be described below. FIGS. 9 and 10 show optical paths of the laser beams under operating conditions of the optical scanner, and FIG. 9 shows the optical paths when viewed from above, and FIG. 10 shows the optical paths when viewed from the side. FIGS. 9 and 10 show only main components relating to the laser beam scanning mechanism out of the components shown in FIGS. 4 and 5.

In the optical scanner, in a state where the polygon mirror 30 rotates at constant speed, firstly, four laser beams LA, LB, LC and LD corresponding to four colors Y, M, C and B are emitted from the light source apparatus 10 disposed on the top surface of the optical base 1. Next, after the laser beams LA, LB, LC and LD emitted from the light source apparatus 10 are reflected by the reflective mirror 20 to be guided toward the polygon mirror 30, the laser beams LA, LB, LC and LD are reflected and deflected in order by each deflection surface 30M of the polygon mirror 30. Then, the laser beams LA, LB, LC and LD deflected by the polygon mirror 30 pass through the fθ lens 40 (41 and 42).

The laser beams LA and LB out of the laser beams LA through LD having passed through the fθ lens 40 are reflected by the reflective mirror 50Y so as to be guided to the bottom surface of the optical base 1 through the opening 1K, and then the laser beams LA and LB are further reflected by the reflective mirror 70Y. After the laser beam LA out of the laser beams LA and LB reflected by the reflective mirror 70Y is reflected by the cylindrical mirror 90A, and passes through the cover glass 100A, the laser beam LA scans the photosensitive drum 110A. On the other hand, after the laser beam LB is reflected by the reflective mirror 80Y and the cylindrical mirror 90B in order, and passes through the cover glass 100B, the laser beam LB scans the photosensitive drum 110B.

Further, after the laser beams LC and LD having passed through the fθ lens 40 are reflected by the reflective mirror 50X so as to be guided to the bottom surface of the optical base 1 through the opening 1K, the laser beams LC and LD are further reflected by the reflective mirror 70X. After the laser beam LC out of the laser beams LC and LD reflected by the reflective mirror 70X is reflected by the reflective mirror 80X and the cylindrical mirror 90C in order, and passes through the cover glass 100C, the laser beam LC scans the photosensitive drum 110C. On the other hand, after the laser beam LD is reflected by the cylindrical mirror 90D, and passes through the cover glass 100D, the laser beam LD scans the photosensitive drum 110D.

Thus, the four laser beams LA, LB, LC and LD emitted from the light source apparatus 10 scan respective scanned surfaces on the four photosensitive drums 110A, 110B, 110C and 110D that are objects to be scanned.

The optical scanner according to the embodiment comprises the light source apparatus 10 in which the four light sources 12A, 12B, 12C and 12D are supported as a unit by one holder 11, so a shift in the optical paths of the laser beams can be prevented, and an influence of a color shift can be reduced because of the following reasons.

Namely, as a technique to mount the four light sources 12A through 12D in the optical scanner, unlike the technique as described in the embodiment, for example, a technique in which the light sources 12A, 12B, 12C and 12D are not supported as a unit by the holder 11 and are separately arranged can be considered. The technique has an advantage that the position of each of the light sources 12A, 12B, 12C and 12D can be freely set in the design of the optical scanner.

However, in the case where the light sources 12A, 12B, 12C and 12D are separately arranged, while the above advantage can be obtained, a color shift becomes pronounced in the full-color laser printer comprising the optical scanner, thereby a problem that it is difficult to obtain higher image quality arises. It is because, for example, in the case where the light sources 12A, 12B, 12C and 12D are separately arranged and fixed to the optical base 1, when the optical base 1 is distorted resulting from a dynamic load which occurs during assembly of the optical scanner, or ambient temperature after the assembly (for example, an increase in the temperature, a temperature difference depending upon position, or the like), the distortion of the optical base 1 causes a shift in the positional relationship among the light sources 12A through 12D, thereby resulting in a shift in a relative positional relationship among the optical paths of the laser beams LA through LD emitted from the light sources 12A through 12D, respectively. It can be considered that the direction of each of the light sources 12A through 12D or the direction of each of the cylindrical mirrors 90A through 90D is adjusted so as to correct the shift in the optical paths, however, when an adjusting mechanism therefor is mounted in the optical scanner, the structure of the optical scanner becomes complicated, and its manufacturing cost increases.

On the other hand, according to the embodiment, since the four light sources 12A through 12D are supported as a unit by one holder 11, as shown in FIGS. 3 and 5, the light sources 12A through 12D are integrally arranged in a specific position (position where the holder 11 is disposed) on the optical base 1. In this case, even if the position where the holder 11 is disposed and its surroundings in the optical base 1 are distorted, an influence of distortion of the position and its surroundings is exerted upon each of the light sources 12A through 12D, which are supported by the holder 11, to substantially the same extent. In other words, compared to the case where the light sources 12A through 12D are separately arranged, even if a shift in the whole arrangement of the light sources 12A through 12D occurs resulting from the distortion of the optical base 1, a large shift in the positional relationship among the light sources 12A through 12D does not occur, thereby, a shift in a relative positional relationship among the optical paths of the laser beams LA through LD becomes less likely to occur. Further, in the embodiment, it is not necessary for the optical scanner to further comprise the adjusting mechanism for adjusting the directions of the light sources 12A through 12D or the directions of the cylindrical lenses 90A through 90D, and only by supporting the four light sources 12A through 12D as a unit by the holder 11, a shift in the optical paths of the laser beams LA through LD can be prevented. Therefore, complication in the structure of the optical scanner and an increase in cost can be prevented.

Therefore, in the embodiment, a shift in the optical paths of the laser beams LA through LD emitted from the light source apparatus 10 (the light sources 12A through 12D) can be prevented, and in the full-color laser printer comprising the optical scanner, while maintaining a simple structure and low cost, an influence of the color shift can be prevented.

Further, in the embodiment, as four light sources 12A, 12B, 12C and 12D are integrally arranged so as to be supported as a unit by the holder 11, a region occupied by the light sources 12A through 12D becomes smaller. Thereby, downsizing of the optical scanner can be achieved, and flexibility in the arrangement of components except for the light sources 12A through 12D can be secured.

Moreover, in the embodiment, as only one holder 11 is required to support the four light sources 12A through 12D, compared to the case where the light sources 12A through 12D are separately supported by four holders, the number of holders for supporting a light source can be reduced. Further, in accordance with a reduced number of holders, manufacturing cost can be reduced, and simpler assembly can be achieved.

In the embodiment, the light source apparatus 10 comprises four light sources 12A through 12D which are supported by one holder 11, so in the optical scanner comprising the light source apparatus 10, a shift in the optical paths of the laser beams LA through LD can be prevented, thereby, a color shift can be prevented. Further, in the embodiment, when components required for optical adjustment, correction or the like of the laser beams LA through LD, such as the collimator lenses 13A through 13D the stops 14A through 14D, the cylindrical lenses 15A through 15D and so on are supported together with the light sources 12A through 12D as a unit by the holder 11, a simpler structure and simpler assembly of the optical scanner can be achieved, compared to the case where these components are arranged separately from the light sources 12A through 12D.

In the embodiment, as shown in FIG. 8, the light sources 12A through 12D of the light source apparatus 10 are arranged so that in the plane (projection plane) including the second direction (Z-axis direction), the laser beams LA and LD emitted from two inner light sources 12A and 12D, respectively, become parallel to each other, and the laser beams LB and LC emitted from two outer light sources 12B and 12C, respectively, come closer to each other, and further the laser beams LA and LD and the laser beams LB and LC intersect with each other on the deflection surface 30M of the polygon mirror 30, so the polygon mirror 30 for deflection can be downsized. The reasons will be described below referring to a comparative example.

Figure 11:
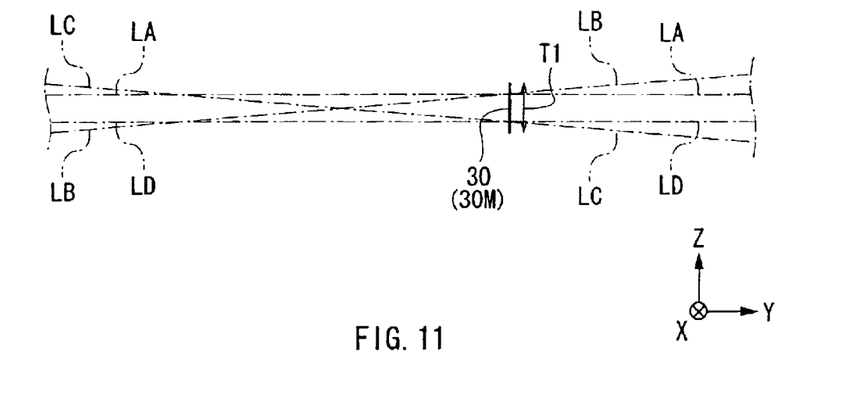
FIG. 11 is an illustration for describing effects relating to downsizing of a polygon mirror in the optical scanner according to the embodiment of the invention.
Figure 12:
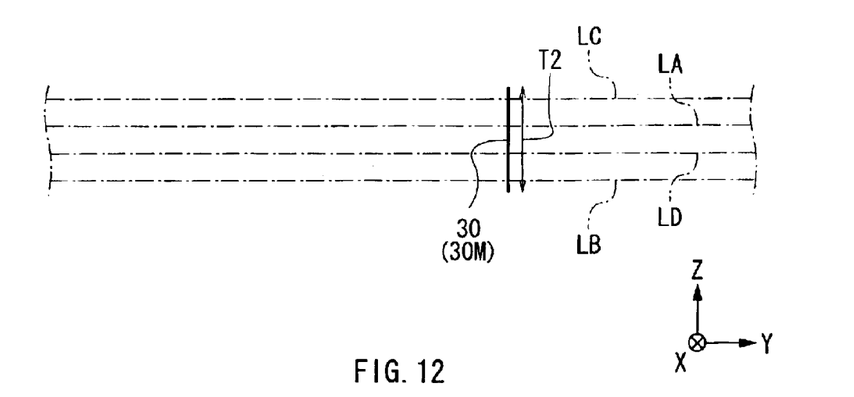
FIG. 12 is an illustration for describing disadvantages of an optical scanner as a comparative example.

FIGS. 11 and 12 are illustrations for describing effects relating to downsizing of the polygon mirror 30. FIG. 11 shows the optical paths of the laser beams LA through LD in the optical scanner according to the embodiment, and FIG. 12 shows the optical paths of the laser beams LA through LD in an optical scanner as a comparative example. Further, FIGS. 11 and 12 show the plane (projection plane) including the second direction as in the case of FIG. 8, and only an arbitrary deflection surface 30M of the polygon mirror 30 in a line shape is shown.

In the comparative example (refer to FIG. 12), the light sources 12A through 12D are arranged so that the laser beams LA through LD emitted from the light source 12A through 12D become parallel to one another. In this case, the polygon mirror 30 (deflection surface 30M) needs to have a thickness T2 corresponding to the whole width of the four laser beams LA through LD which are parallel to one another.

On the other hand, in the embodiment (refer to FIG. 11), the light sources 12A through 12D are arranged so that in the plane (projection plane) including the second direction, only two inner laser beams LA and LD are parallel to each other, and the other two outer laser beams LB and LC come closer to each other, so when the polygon mirror 30 is disposed in a position where the laser beams LA and LD and the laser beam LB and LC intersect with each other, that is, a position where the whole width of four laser beams LA through LD becomes narrower, the polygon mirror 30 needs only a thickness corresponding to a width between the laser beams LA and LD parallel to each other, that is, a thickness T1, which is smaller than the thickness T2 in the comparative example (T1<T2). Therefore, in the embodiment, the polygon mirror 30 and the optical scanner can be downsized. Specifically, according to the downsized the polygon mirror 30, the power consumption thereof can be reduced, and a more stable rotating mechanism thereof can be achieved.

Moreover, in the embodiment, the light sources 12A through 12D are arranged so that in the plane (projection plane) including the second direction, the laser beams LA and LD become parallel to each other, and the laser beams LB and LC come closer to each other, so when curvature of scanning lines on the photosensitive drums 110A, 110B, 110C and 110D by the laser beams LA, LB, LC and LD emitted from the light sources 12A, 12B, 12C and 12D, respectively, is corrected, the number of laser beams which require correction of the curvature can be reduced. The reasons will be described below.

Figures 13A, 13B:
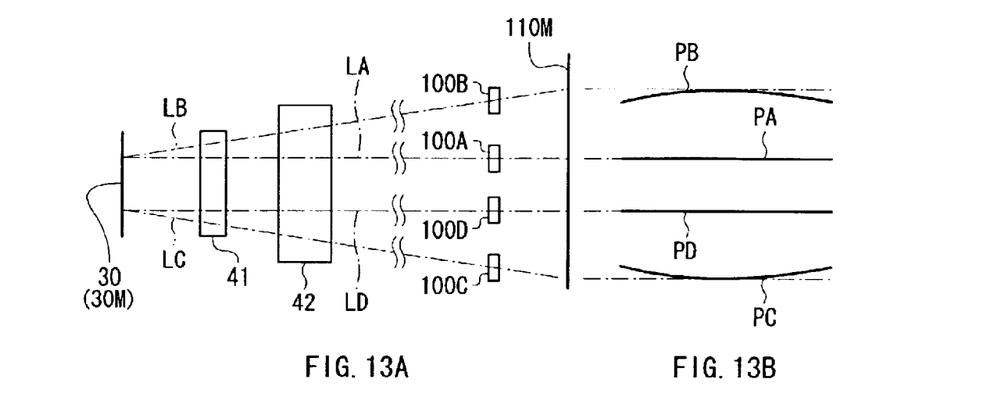
FIGS. 13A and 13B are illustrations showing a state before correcting curvature of scanning lines by the laser beams in the optical scanner according to the embodiment of the invention.
Figures 14A, 14B:
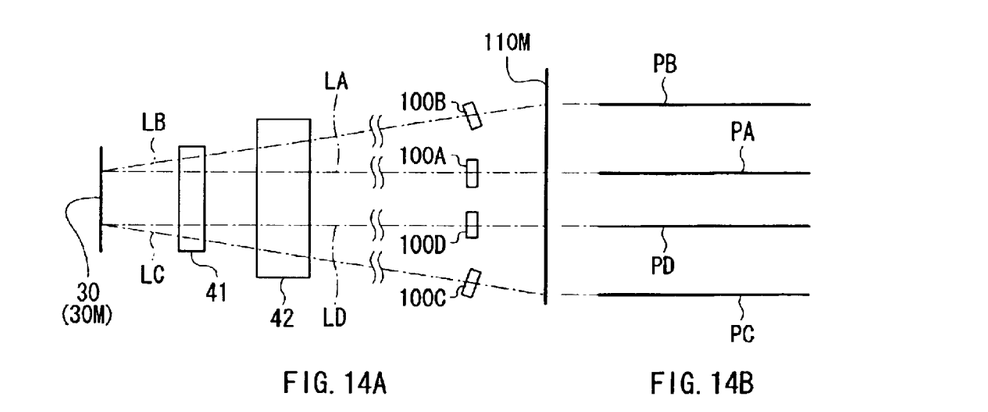
FIGS. 14A and 14B are illustrations showing a state after correcting the curvature of the scanning lines by the laser beams in the optical scanner according to the embodiment of the invention.

FIGS. 13A, 13B, 14A and 14B show illustrations for describing a method of correcting the curvature of the scanning lines by the laser beams LA, LB, LC and LD, and FIGS. 13A and 13B show a state before correction, and the FIGS. 14A and 14B show a state after correction. Further, FIGS. 13A and 14A show the optical paths of the laser beams LA, LB, LC and LD between the polygon mirror 30 (deflection surface 30M) and the scanned surfaces 110M on the photosensitive drums 110A, 110B, 110C and 110D, and FIGS. 13B and 14B show scanning lines PA, PB, PC and PD on the photosensitive drum 110A, 110B, 110C and 110D by the laser beams PA, PB, PC and PD, respectively.

In the case where the light sources 12A through 12D are arranged so that in the plane (projection plane) including the second direction, the laser beams LA and LD become parallel to each other, and the laser beams LB and LC come closer to each other, as described above, downsizing of the polygon mirror 30 is advantageous, however, on the other hand, a problem in the scanning mechanisms of the laser beams LB and LC arises. More specifically, as shown in FIGS. 13A and 13B, in the case where the cover glasses 100A, 100B, 100C and 100D are parallel to the scanned surface 110M (refer to FIG. 13A), the scanning lines PA and PD of the laser beams LA and LD, respectively, are normal, that is, linear, but the scanning lines PB and PC of the laser beams LB and LC, respectively, are curved (refer to FIG. 13B).

The phenomenon that the scanning lines PB and PC are curved can be almost corrected by using, for example, the cover glasses 100B and 100C. In other words, as shown in FIGS. 14A and 14B, when the cover glasses 100B and 100C are inclined at an axis of the first direction (X-axis direction) (that is, an axis of a longitudinal direction) as a center (refer to FIG. 14A), the scanning lines PB and PC become as linear as the scanning lines PA and PD.

In terms of downsizing of the polygon mirror 30, when the light sources 12A through 12D are arranged so that all laser beams LA through LD come closer to one another in the plane (projection plane) including the second direction, the thickness of the polygon mirror 30 can be minimized. However, in this case, all scanning lines PA through PD are curved, so in order to correct the phenomenon that the scanning lines PA through PD are curved, it is required to adjust an angle of each of the cover glasses 100A through 100D, thereby, the number of spots where it is required to correct curvature of the scanning lines PA through PD by using the cover glasses 100A through 100D increases.

Therefore, as described in the embodiment, when the light sources 12A through 12D are arranged so that in the plane (projection plane) including the second direction, the laser beams LA and LD become parallel to each other, and the laser beams LB and LC come closer to each other, downsizing of the polygon mirror 30 can be achieved, and the number of laser beams which require correction of the curvature of the scanning lines can be reduced.

In the embodiment, four light sources 12A, 12B, 12C and 12D corresponding to four color Y, M, C and B are mounted in the holder 11, but it is not necessarily limited to this, and the number of light sources mounted in the holder 11 can be variously modified within a range of four or more light sources. In the case where the number of light sources mounted in the holder 11 is five or more, the same effects as those in the embodiment can be obtained.

Moreover, in the embodiment, in the light source apparatus 10, the collimator lenses 13A through 13D and the cylindrical lenses 15A through 15D each have a position adjusting mechanism, but it is not necessarily limited to this. For example, only either the collimator lenses 13A through 13D or the cylindrical lens 15A through 15D may have the position adjusting mechanism. In this case, the position adjusting mechanisms in either the collimator lenses 13A through 13D or the cylindrical lens 15A through 15D are not required, so the structure of the light source apparatus 10 can be simplified.

The present invention is described referring to the embodiment, but the invention is not limited to the embodiment, and can be variously modified. More specifically, for example, in the embodiment, the case where the optical scanner of the invention is applied to the full-color laser printer is described, but it is not necessarily limited to this, and the optical scanner of the invention is applicable to a single-beam type monochrome laser printer using a single laser beam or a multi-beam type monochrome laser printer using a plurality of laser beams. Moreover, the invention may be applicable to any other printer except for the laser printer capable of forming an image by using the light beam scanning mechanism, or any other optical apparatus except for the printers. As specific examples of "any other optical apparatus", a facsimile, a copying machine, a combination thereof, or the like is cited.

As described above, in the light source apparatus according to the invention, four or more light sources each emitting a light beam are supported by one supporting body, so compared to the case where four or more light sources are separately arranged, even if distortion of the supporting body (optical base) supporting each light source occurs, an influence of the distortion is exerted upon each light source to substantially the same extent, thereby, a large shift in a relative positional relationship between each light source does not occur. Therefore, a mutual shift of optical paths between each light beam can be prevented. Specifically, when the light source apparatus is used to form a color image, a decline in image quality due to a color shift can be prevented.

The optical scanner according to the invention comprises the light source apparatus of the invention, so a mutual shift of optical paths between a plurality of light beams can be prevented. Therefore, when the optical scanner is used to form a color image, a decline in image quality due to a color shift can be prevented.

Moreover, in the light source apparatus according to the invention, the light sources are arranged so that light beams emitted from two outer light sources out of four or more light sources become parallel to each other in the plane including the second direction corresponding to the sub-scanning direction, and light beams emitted from two inner light sources come closer to each other in the plane including the second direction, and further the light beams emitted from the two outer light sources and the light beams emitted from the two inner light sources intersect with each other in the deflection surface of the light deflection apparatus, so it is sufficient that the light deflection apparatus has a thickness corresponding to a width between two light beams which are parallel to each other in the plane including the second direction. Therefore, downsizing of the light deflection apparatus can be achieved, and the number of light beams which require correction of the curvature of the scanning lines on the scanned surface can be reduced.

In the light source apparatus according to the invention, each light source includes a collimator lens, a stop and a cylindrical lens. Compared to the case where these components are disposed separately from the light source, the structure of the optical scanner can be further simplified.

Obviously many modifications and variations of the present invention are possible in the light of the above teachings. It is therefore to be understood that within the scope of the appended claims the invention may be practiced otherwise than as specifically described.

What is claimed is:

1. A light source apparatus, being used in an optical scanner for scanning a scanned surface by a plurality of light beams, the light source apparatus comprising;

four or more light sources each emitting a light beam;

wherein the light beam is deflected by a deflection surface of a light deflection apparatus so as to scan the scanned surface;

one supporting body supporting the four or more light sources arranged along a first direction corresponding to a main scanning direction; and     the four or more light sources are arranged so that light beams emitted from light sources come closer to one another in a plane including the first direction, and light beams emitted from two outer light sources become parallel to each other in a plane including a second direction corresponding to a sub-scanning direction, and light beams emitted from two inner light sources come closer to each other in the plane including the second direction, and further the light beams emitted from the two outer light sources and the light beams emitted from the two inner light sources intersect with each other on the deflection surface of the light deflection apparatus.

2. A light source apparatus according to claim 1, wherein the four or more light sources are arranged in a staggered pattern in a plane including the first direction and the second direction.

3. A light source apparatus according to claim 1, further comprising:

a collimator lens for each of light sources;

a stop for each of light sources; and a cylindrical lens for each of light sources.

4. A light source apparatus according to claim 3, wherein the position of at least one of the collimator lens or the cylindrical lens is adjustable.

5. An optical scanner, comprising:

a light source apparatus emitting a plurality of light beams to scan a scanned surface; and a light deflection apparatus deflecting the plurality of light beams emitted from the light source apparatus so as to scan the scanned surface;

wherein the light source apparatus comprises;

four or more light sources each emitting a light beam, and one supporting body supporting the four or more light sources arranged along a first direction corresponding to a main scanning direction; and the four or more light sources are arranged so that light beams emitted from light sources come closer to one another in a plane including the first direction, and light beams emitted from two outer light sources become parallel to each other in a plane including a second direction corresponding to a sub-scanning direction, and light beams emitted from two inner light sources come closer to each other in the plane including the second direction, and further the light beams emitted from the two outer light sources and the light beams emitted from the two inner light sources intersect with each other on the deflection surface of the light deflection apparatus.

* * * * *